United States Patent
Boyer et al.

(10) Patent No.: US 11,934,205 B2
(45) Date of Patent: Mar. 19, 2024

(54) METHOD FOR MANAGING THE CONTINUOUS CLIMB OF AN AIRCRAFT OR DRONE

(71) Applicant: THALES, Courbevoie (FR)

(72) Inventors: Johan Boyer, Toulouse (FR); Geoffrey Durand, Toulouse (FR); Jérôme Sacle, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/775,865

(22) PCT Filed: Nov. 13, 2020

(86) PCT No.: PCT/EP2020/082080
§ 371 (c)(1),
(2) Date: May 10, 2022

(87) PCT Pub. No.: WO2021/094551
PCT Pub. Date: May 20, 2021

(65) Prior Publication Data
US 2022/0390959 A1  Dec. 8, 2022

(30) Foreign Application Priority Data
Nov. 14, 2019 (FR) ...................... 1912690

(51) Int. Cl.
*G05D 1/06* (2006.01)
*B64C 19/00* (2006.01)
(Continued)

(52) U.S. Cl.
CPC ......... *G05D 1/0607* (2013.01); *B64C 39/024* (2013.01)

(58) Field of Classification Search
CPC .................................................. B64C 39/024
See application file for complete search history.

(56) References Cited

U.S. PATENT DOCUMENTS

2008/0027629 A1  1/2008  Peyrucain et al.
2012/0078450 A1  3/2012  Marche et al.
(Continued)

OTHER PUBLICATIONS

Walter, "The Avionics Handbook, Chapter 15: Flight Management Systems", CRC Press, pp. 1-25, XP-002648022, 2001.

*Primary Examiner* — Geepy Pe
*Assistant Examiner* — Kimia Kohankhaki
(74) *Attorney, Agent, or Firm* — BakerHostetler

(57) ABSTRACT

Methods and devices for optimizing the climb of an aircraft or drone are provided. After an optimal continuous climb strategy has been determined, a lateral path is determined, in particular in terms of speeds and turn radii, based on vertical predictions computed in the previous step. Subsequently, computation results are displayed on one or more human-machine interfaces and the climb strategy is actually flown. Embodiments describe the use of altitude and speed constraints and/or settings in respect of speed and/or thrust and/or level-flight avoidance and/or gradient-variation minimization, and iteratively fitting parameters in order to make the profile of the current path coincide with the constrained profile in real time depending on the selected flight dynamics (e.g. energy sharing, constraint on climb gradient, constraint on the vertical climb rate). System (e.g. FMS) and software aspects are described.

8 Claims, 9 Drawing Sheets

(51) Int. Cl.
*B64C 39/02* (2023.01)
*G05D 1/00* (2006.01)

(56) References Cited

U.S. PATENT DOCUMENTS

| | | | |
|---|---|---|---|
| 2015/0262490 A1* | 9/2015 | Deker | G05D 1/101 |
| | | | 701/3 |
| 2015/0378358 A1* | 12/2015 | Gutierrez-Castaneda | ............. |
| | | | G05D 1/042 |
| | | | 701/8 |
| 2016/0104382 A1* | 4/2016 | Besada Portas | G08G 5/0095 |
| | | | 701/540 |
| 2018/0067500 A1* | 3/2018 | Kim | G05D 1/0607 |
| 2020/0026307 A1* | 1/2020 | Lax | G05D 1/0607 |
| 2020/0118448 A1* | 4/2020 | Figlar | G05D 1/042 |
| 2020/0168106 A1* | 5/2020 | De Prins | G08G 5/003 |

* cited by examiner

METHOD FOR MANAGING THE CONTINUOUS CLIMB OF AN AIRCRAFT OR DRONE

CROSS-REFERENCE TO RELATED APPLICATIONS

This application is a National Stage of International patent application PCT/EP2020/082080, filed on Nov. 13, 2020, which claims priority to foreign French patent application No. FR 1912690, filed on Nov. 14, 2019, the disclosures of which are incorporated by reference in their entirety.

FIELD OF THE INVENTION

This document describes methods and systems in the technical field of flight-management systems (FMS), and more generally avionic or non-avionic navigation systems employed on-board aircraft (such as tablets or EFB) or located remotely on the ground. More particularly, the invention addresses methods and systems for computing paths.

BACKGROUND

An aircraft path (or "profile") comprises a succession of constrained climb and/or descent and/or level-flight segments in order to meet the altitude and speed constraints specified in departure procedures.

In the prior art, the assumptions generally used to build a climb profile are an integration in "energy sharing" mode, i.e. the excess energy delivered by the engines (above that required to keep the aircraft at its current altitude and speed) is used to reach the "target settings", some being used to accelerate to a target speed (speed constraint or optimized speed) and the rest being used to climb to a target altitude (altitude constraint or cruising level). In this embodiment, during a climb segment, the energy distribution remains constant and the thrust delivered by the engines is the maximum climb thrust. The climb rate, which is considered equivalent to the gradient of the climb segment in the remainder of the description, is the result of the computation thus made and not an input parameter.

If it is high, this may lead to level flight being required, to meet a subsequent altitude constraint. Level flight is on the one hand not compatible with the CCO concept (CCO standing for continuous climb operation), which aims to optimize climb phases, and on the other hand this succession of periods of level flight/climbing is undesirable from the point of view of passenger comfort and/or engine maintenance (because of the large variations in thrust at the start and end of each period of level flight).

If it is low, altitude constraints may not be met, with a potential impact on safety, or the lateral path to the altitude desired at a given point (e.g.: HA flight segment or leg) may be lengthened, with an impact on fuel consumption.

Currently, climb profile is therefore computed taking into account target speeds and target altitudes. Generally, current solutions are unsatisfactory or have limitations.

There is a need for advanced methods and systems for computing profiles, in particular climb profiles.

SUMMARY OF THE INVENTION

This document relates to methods and devices for optimizing the climb of an aircraft or drone. After an optimal continuous climb strategy has been determined, a lateral path is determined, in particular in terms of speeds and turn radii, based on vertical predictions computed in the previous step. Subsequently, computation results are displayed on one or more human-machine interfaces and the climb strategy is actually flown. Embodiments describe the use of pseudo-constraints in respect of altitude, speed and/or level-flight avoidance, and iteratively fitting parameters in order to make the profile of the current path coincide with the constrained profile in real time depending on the selected flight dynamics (e.g. energy sharing, constraint on climb gradient, constraint on the vertical climb rate). System (e.g. FMS) and software aspects are described.

The invention especially consists in determining a "smoothed" climb profile meeting all of the constraints of the procedure, while minimizing or eliminating level-flight stages and while minimizing gradient variations, and in providing a dedicated interface specifying the fitting parameters during the climb.

During the construction of the climb profile, it is necessary to meet the altitude and speed constraints associated with the departure procedure while avoiding suboptimal, time-wasting constant-altitude level-flight stages.

The invention allows a path with an optimized climb profile to be computed, by refining the computation to reach the constrained points optimally, i.e. neither too early nor too late. It smooths the profile, while avoiding reducing it to a few speed values and a single thrust value. The solution may be a simple parameter fit (or a new geometric profile-building strategy) for converging to the target altitude at the target location along the flight plan.

With respect to existing systems, the solution provides comfort, and a better compliance with constraints at flight points, at an equivalent or even slightly lower fuel consumption.

BRIEF DESCRIPTION OF THE DRAWINGS

Other features and advantages of the invention will become apparent with the aid of the description which follows and the figures of the appended drawings, in which.

DETAILED DESCRIPTION

Figure 1:
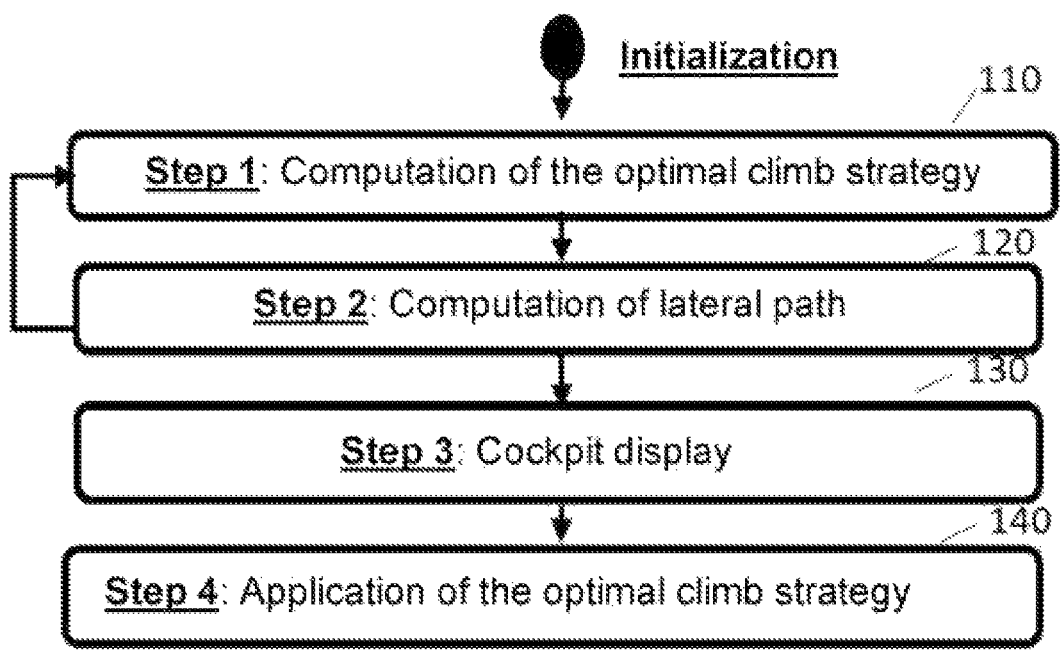
FIG. 1 shows a flowchart which illustrates the general steps of the method of the invention.

The embodiments of the invention may be adapted to various means of transport, especially including a drone, or a commercial plane, or a freight plane, or even a helicopter, whether carrying passengers or not. More generally, the invention relates to any type of vehicle: automobile, truck, bus, train, motorbike, boat, robot, submarine, etc.; or any element that may be remotely piloted (by radio, satellite, or other link), at least partially (intermittently, or periodically, or even opportunistically over time).

The invention consists in determining a flyable path meeting all the constraints of the departure procedure on constrained portions or constrained segments.

A method is described for optimizing the climb of an aircraft or drone, comprising the steps of: —determining an optimal continuous climb strategy; —determining a lateral path, and especially turn radii and/or the roll angles, based on speed and altitude predictions computed in the previous step. The choice of speed profile forms part of the strategy, just like the choice of thrust, the choice of roll angle and the choice of altitude constraints (including tolerances or compliance margins).

It will be noted that, due to cohesion between vertical and lateral computations, the predictions are computed first on the basis of a pseudo-path based on direct distances between points, and then recomputed, once the lateral path has been established with the transitions. This mechanism is shown in the overall flowchart of the method by the feedback between two steps.

In one embodiment, the optimal continuous climb path is determined depending on predefined flight-profile parameters, said parameters comprising altitude and/or speed constraints, and/or settings in respect of speed and/or thrust and/or level-flight avoidance and/or gradient-variation minimization.

In one embodiment, the predefined strategy comprises one or more of the parameters selected from:
  a setting in respect of the energy-sharing ratio;
  a setting in respect of the climb gradient;
  a setting in respect of the vertical climb rate;
  a setting in respect of the longitudinal speed during the climb; and/or
  a setting in respect of the climb thrust; and/or
  a setting in respect of the roll angle.

In one embodiment, the method comprises a step of iteratively fitting parameters in order to make the profile of the current path coincide with the constrained profile in real time, depending on the selected flight dynamics or strategy.

In one embodiment, the flight dynamics comprise manipulations of speed and engine thrust.

In one embodiment, the flight dynamics comprise manipulations of energy-sharing ratio.

In one embodiment, the flight dynamics comprise a setting in respect of climb gradient.

In one embodiment, the flight dynamics comprise a setting in respect of vertical climb rate.

In one embodiment, the flight dynamics comprise a setting in respect of roll angle.

In one embodiment, one or more intermediate computation results, pieces of information relating to the root causes and/or the computation context of the steps of the method are displayed on a human-machine interface.

The display steps may be tailored to the user. A method according to the invention may comprise one or more feedback loops (e.g. downstream feeding back to upstream, feedforward, etc.). A feedback loop may be "closed", i.e. inaccessible to human control (it is run by the machine). It may be "open" (e.g. step of displaying on a human-machine interface, validation or any other system of human confirmation). By closing or opening, respectively, one or more open or closed loops, respectively, various embodiments may result in different implementations. For example, the method according to the invention may involve only open feedback loops (i.e. the pilot intervenes at every stage), or indeed only closed feedback loops (e.g. complete automation), or else a combination of the two (the human contribution being variable or configurable). Thus, the method (which may be an "artificial intelligence" method) may be interpreted as being "transparent", in that it is controllable. The display may regard intermediate computation results, pieces of information relating to the root causes and/or to the computing context. As such, the method may be considered to be "explicable".

In one embodiment, the method further comprises the step of applying the optimal continuous climb strategy, for example by transmitting all or some of the computed information with a view to it being actually exploited by avionic systems in order to apply the obtained optimal climb strategy.

For example, the computer may communicate the target values (such as speed/thrust) to the servo system, with a view to having new settings automatically taken into account. All or some of the fitted parameters are transmitted so as to be taken into account by other systems, for example for airplane servo-control, such as an autopilot.

A system is described that comprises one or more avionic (FMS) or non-avionic (on-board tablet) navigation computers or a navigation computer located remotely on the ground, for implementing one or more of the steps of the method.

A computer program product is described, said computer program comprising code instructions that allow one or more of the steps of the method to be performed when said program is executed on a computer.

FIG. 1 shows a flowchart which illustrates the steps of the method of the invention.

After the computation of the optimal climb strategy (110), a lateral path (120) then a cockpit display (130) are determined, and lastly the optimal climb strategy (140) is applied.

In particular, step 120 may comprise a step of computing the lateral path on the basis of predictions computed in step 110, and, in particular, on the basis of predicted speeds, which are required to determine the turn radii for which to provide. In this step, the setting in respect of "roll angle used to compute the turn radii" may be fitted so as to obtain a path length suitable for meeting binding constraints of the flight plan. This step may allow, depending on the need, the path to shortened or lengthened, in cases where the goal is to avoid level flight or to meet a binding constraint that the optimal climb strategy has not made it possible to meet, respectively.

The system display step 130 may consist in displaying all or some of the computed information, with a view to allowing the pilot to understand the assumptions made by the system.

Step 140 consists in applying the computed optimal climb strategy. This step may especially consist in transmitting all or some of the computed information to be used by external systems, in order to apply the obtained optimal climb strategy. For example, it is possible to imagine sending target values (such as speed/thrust) to the servo system, with a view to having new settings automatically taken into account.

Figure 2:
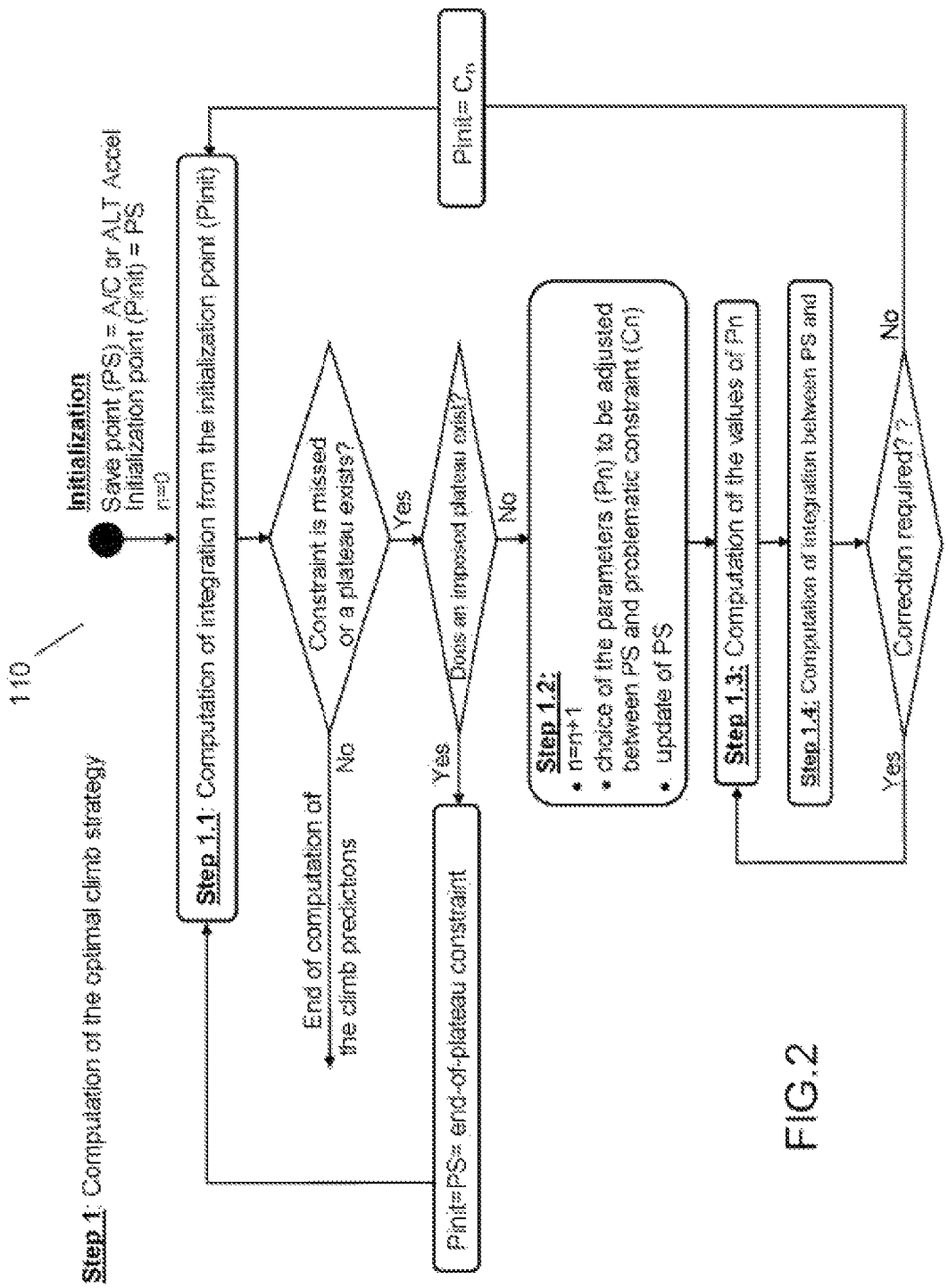
FIG. 2 shows an example of steps corresponding to the step of computing the optimal climb strategy of FIG. 1.

FIG. 2 shows an example of steps corresponding to the computation of the optimal climb strategy of step 110 of FIG. 1. FIG. 2 shows various parameters, namely:

$C_n$, which designates, during integration, the nth constraint problematic to the set criteria of success, said criteria including:
  no constraint is missed;
  no altitude plateau or change in gradient setting is essential to meeting the altitude constraint;
  no change in speed setting is essential to meeting the speed constraint;
$P_n$, which designates the parameter that makes $C_n$ compatible with the set criteria of success;
PS, which designates the save point of the integration. At this point, the context (predicted airplane state) is stored in memory, this avoiding the need to redo the computation from the very first initialization point, which would be penalizing from a performance point of view.

The method may be initialized within the already existing computation of vertical climb predictions made by a flight management system (FMS), or any other equivalent system. This profile is computed from the airplane (or failing that the runway if the aircraft is on the ground) to cruising level, which is reached at a point called the "top of climb" (ToC).

Step 110 consists in computing the optimal climb strategy, and allows vertical predictions to be delivered. To do this, within the computation of the climb profile, taking into account current parameters (such as mass, wind, temperature, etc.), from a given integration point (step 1.1), the next altitude constraint that is missed or that results in level flight or a change in gradient, or the next speed constraint that induces a change in speed setting, is determined. If a constraint of this type is found, i.e. a binding constraint, certain flight parameters are adjusted (steps 1.2 to 1.4) in order to ensure these constraints are met, depending on the capacities of the aircraft and weather conditions known to the system.

The adjusted flight parameters must allow the climb profile to be flown:
  while meeting altitude constraints;
  while avoiding the use of plateaus in altitude constraints, unless they allow speed constraints to be met or are imposed by two altitude constraints of the same value;
  while respecting speed constraints.

It will be noted that, in certain configurations, depending on the capacities of the airplane, it is not possible to simultaneously meet speed and altitude constraints. In this case, for safety reasons, priority is given to meeting the altitude constraint while guaranteeing the aircraft flight envelope is not breached.

Returning to FIG. 1, a next step 120 is the computation of the lateral path tolerated by the previous computation of vertical predictions required to determine the turn radii and speeds for which to provide.

It will be noted that, due to cohesion between vertical and lateral computations, the predictions are computed first on the basis of a pseudo-path based on direct distances between points, and then recomputed, once the lateral path has been established with the transitions. This mechanism is shown in the overall flowchart of the method by the feedback between steps 110 and 120.

The iterating step between steps 110 and 120 will consist of an incremental method for solving a binding constraint (Cn) for a constrained segment on the basis of a save point issued from the previous constrained segment (Cn−1). The save point may be re-estimated in order to solve the binding constraint (Cn). The segment-by-segment fit may lead to reconsideration of the i previous segments impacted by the solution of constraint n, the setting parameters selected being applicable to all of the constrained climb segments between Cn−i and Cn.

A subsequent step is the display 130 in the cockpit of all or some of the computed data, so as to facilitate understanding on board.

A subsequent step comprises applying 140 the optimal climb strategy by transmitting all or some of the fitted parameters to be taken into account by other systems, for example for airplane servo-control, such as an autopilot for example.

Returning to FIG. 2, step 110 of computing the optimal climb strategy will now be described in detail.

The aim is to compute the optimal climb strategy, which takes the form of vertical climb predictions, which will be the concatenation of unitary predictions (in the sense of a given integration hypothesis between 2 given save points). The context (predicted airplane state) at the save point is stored in memory.

Step 1.1: Computation of Integration Over the Segment

The method computes vertical climb predictions, from a previously established initialization point Pinit. An integration computation is performed from this point to cruising level, under the usual climb assumptions, i.e. in "energy sharing" mode (sharing between potential energy and kinetic energy), with the following parameters: The target speed, which is the speed optimized from a performance point of view, limited by the various speed constraints, with an upper (AT OR BELOW or AT or WINDOW) limit,
  The engine thrust, which is the nominal climb thrust (by default the maximum climb thrust),
  The energy-sharing ratio, which is the default target ratio, given for example by a performance table.

With regard to the management of altitude constraints, three scenarios are possible (the reasoning is analogous to that given with respect to speed constraints):
  (1) No altitude constraint has been missed and there are no altitude plateaus before cruising level is reached—the method stops the computation of climb predictions and passes to step 120,
  (2) An altitude plateau exists but it is due to two altitude constraints of the same value (e.g. two "AT" constraints at the same altitude)—the method returns to step 1.1, with the end-of-plateau constraint taken as the new save point of the method and as the new point of initialization of the integration (Pinit=PS=constraint at the end of the plateau),
  (3) In other cases, the method passes to step 1.2.

The initialization point Pinit and the save point PS are initialized at the start of the computation of the climb-phase predictions, the climb generally being equivalent to achievement of the characteristic altitude referred to as "altitude acceleration" or of the aircraft if the latter is above this altitude.

Step 1.2: Selection of the Parameters to be Adjusted.

This step consists in choosing the parameters of the integration to be corrected in order to seek to meet the various speed and altitude constraints while avoiding altitude plateaus. The parameters to be adjusted depend on the chosen strategy. A first possibility (others will be described by way of variants below) is to still employ an integration in "energy sharing" mode (sharing between potential energy and kinetic energy) with the default energy-sharing ratio. In contrast, the engine-thrust or speed parameters are adjusted as far as possible between the save point PS and the problematic constraint or binding constraint ($C_n$) (n being incremented in each iteration of this step).

Two scenarios are possible (to be considered in this order of priority):
(1) The binding altitude constraint $C_n$, with a lower (AT OR ABOVE or AT or WINDOW) limit, is missed, this meaning that the overall system lacks the energy to increase its potential energy. In this case, the adjusted parameter ($P_n$) is target speed. In the particular case where the engine thrust used during the climb is not the maximum climb thrust but a reduced thrust, as a result of noise issues for example, the thrust will be increased beforehand to the maximum thrust before the speed parameter is adjusted.
(2) A plateau exists at the altitude of a binding altitude constraint, with an upper (AT OR BELOW or AT or WINDOW) limit (not due to two altitude constraints of the same value): in this case, the adjusted parameter ($P_n$) is target thrust.

$P_n$ is therefore the integration parameter to be adjusted from the last save point (PS) to correct the problem associated with the binding constraint $C_n$.

The save point PS is also updated and positioned at $C_{n-1}$ when it is a question of an "AT" constraint or when the correction parameter changes at $C_{n-1}$ (i.e. $P_{n-1}$ and $P_n$ are different). PS may be updated only when it is certain that the integration up to that point is the best possible, i.e. no upstream loopback will be required to correct a future problem.

Step 1.3: Computation of the Parameters to be Adjusted

This step consists in computing and correcting the integration parameter chosen in the previous step.

Figure 3:
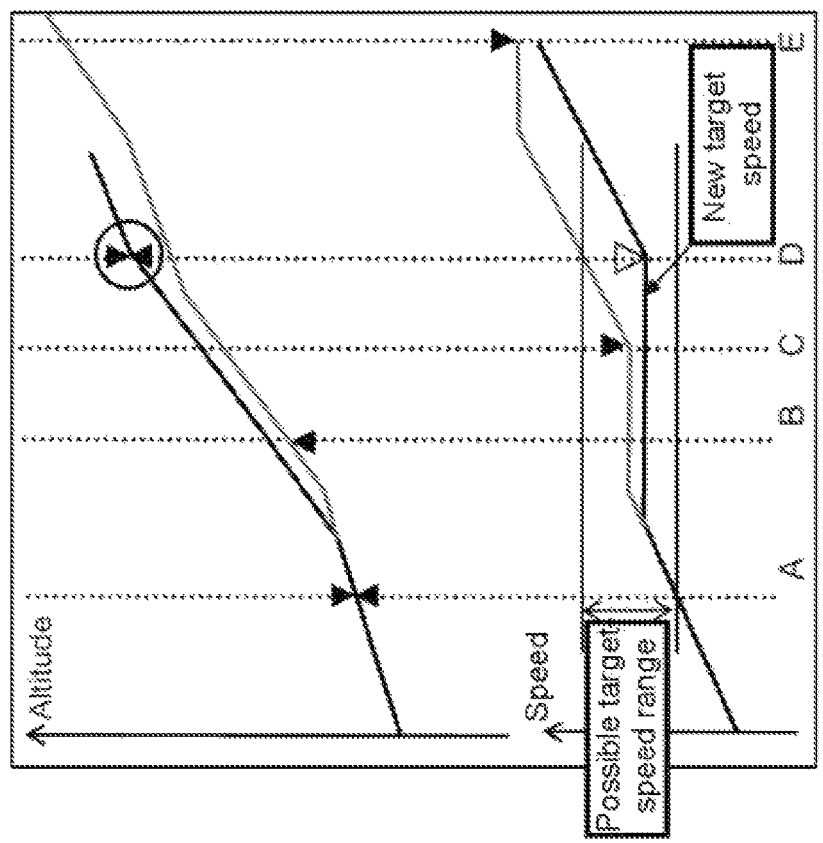
FIG. 3 illustrates a situation in which the fitted parameter is the target speed.
Figure 3:
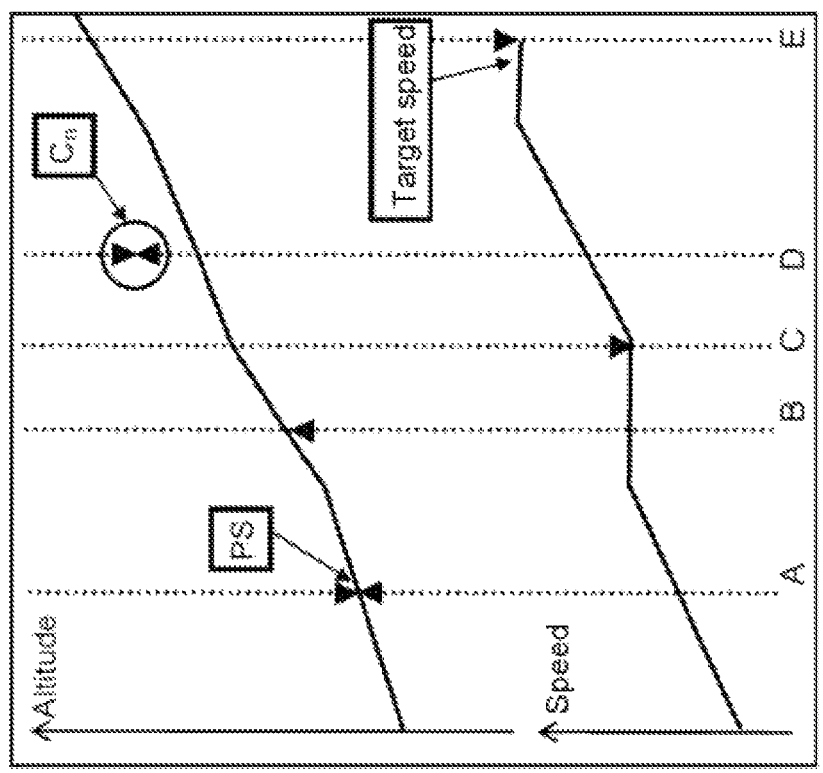

When the adjusted parameter Pn is target speed, three scenarios are to be considered (in this order of priority):
(1) Case 1: a plateau exists at the altitude of an altitude constraint comprised between PS and $C_n$ inclusive (not due to two altitude constraints of the same value) (possibly with a tolerance, for example 1 NM): this case arises when the target speed was previously lowered to meet the altitude constraint $C_n$. After integration, a plateau exists at an intermediate constraint (necessarily an "AT or BELOW" or "WINDOW" constraint) or at $C_n$. In this case, the target speed is increased in order to obtain a lower climb rate. The target speed must be comprised between the previous target speed and the upper limit of the previous range. The objective here is to maximize speed to minimize flight time, while meeting all the altitude and speed constraints required to avoid altitude plateaus. The method then passes to the next integration step, step 1.4.
(2) Case 2: the altitude constraint $C_n$ is missed (possibly with a tolerance, for example 100 ft): in this case, the target speed is lowered in order to obtain a better climb rate. The target speed must be comprised between the speed reached at the initialization of the integration (i.e. reached at the save point of the method) (or as a variant the minimum speed of the flight envelope), i.e. on the first correction (or otherwise the lower limit of the previous range) and the speed reached at the missed constraint. This situation is illustrated in FIG. 3. In the case where the previous target speed was already the lower limit of the range, the method passes directly to the next step 1.1, with $C_n$ taken as the new point of initialization of the integration (Pinit=Cn), without additional correction. In other cases, the method then passes to the next integration step, step 1.4.
(3) Case 3: the altitude at the constraint $C_n$ is strictly higher than the lower limit of the constraint (possibly with a tolerance, for example 100 ft). This case arises when the target speed was previously lowered to meet the altitude constraint. After integration, the altitude at the constraint is clearly higher (necessarily an AT or ABOVE or WINDOW constraint). In this case, even if the target speed allows the various constraints to be met, it is restrictive and of no interest. Therefore, the target speed is increased in order to obtain a lower climb rate. The target speed must be comprised between the previous target speed and the upper limit of the previous range. The method then passes to the next integration step, step 1.4.

In all the previous cases, the new target speed will possibly be obtained via various methods (dichotomy in the possible range, brute force, secant method, estimator, etc.). This target speed will be considered to be an AT or BELOW "pseudo" speed constraint applied at $C_n$ In other cases (e.g.: missed speed constraint), the method passes to step 1.1 of FIG. 2, with $C_n$ taken as the new point of initialization of the integration (Pinit=Cn).

When the adjusted parameter Pn is target thrust (initially because of an undesired plateau at an altitude constraint), four scenarios are to be considered (in this order of priority):
(1) Case 1: an altitude constraint is missed between PS and $C_n$ inclusive (possibly with a tolerance, for example 100 ft): This case arises when the target thrust was previously lowered to avoid a plateau. After integration, a constraint is missed. In this case, the target thrust is increased in order to obtain a higher climb rate. The target thrust must be comprised between the previous target climb thrust and the upper limit of the previous range. The method then passes to the next integration step, step 1.4.
(2) Case 2: a speed constraint is missed (possibly with a tolerance, e.g. 5 kts): This case arises when the target thrust was previously lowered to avoid a plateau. After integration, a speed constraint is missed. Then the target thrust is increased in order to obtain a better acceleration. It must be comprised between the previous target thrust and the upper limit of the previous range. In this case, it is more important to meet the speed constraints than to avoid altitude plateaus.

In the case where the previous target speed was already the maximum climb thrust, the method passes directly to step 1.1 of FIG. 2, with $C_n$ taken as the new point of initialization of the integration (Pinit=Cn), but otherwise the method then passes to the next integration step, step 1.4.
(3) Case 3: there is an altitude plateau (not due to two altitude constraints of the same value) (possibly with a tolerance, for example 1 NM): in this case, the target thrust is lowered in order to obtain a lower climb rate. The target thrust must be comprised between the minimum allowable engine thrust (conventionally called the "idle" thrust) on the first correction for this constraint (or otherwise the lower limit of the previous range) and the previous target thrust.

Figure 4:
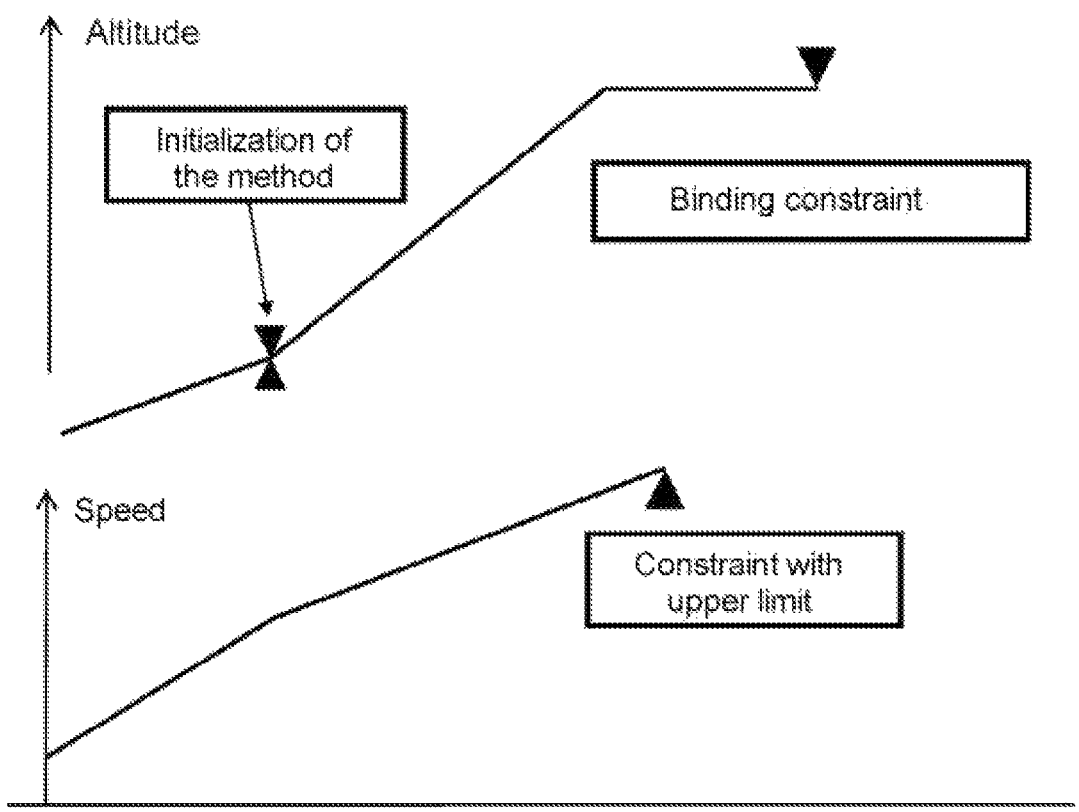
FIG. 4 illustrates one example in which an altitude plateau (level flight) is not corrected.

In the case where the previous target thrust was already the lower limit of the range or where it only just allowed the lower limit of an "AT OR ABOVE" or "AT or WINDOW" speed constraint to be met (i.e. the speed of the lower limit is not reached laterally before the constraint), the method passes to step 1.1 of FIG. 2, with $C_n$ taken as the new point of initialization of the integration (Pinit=Cn), but otherwise the method passes to the next step, step 1.4. FIG. 4 illustrates an example in which the altitude plateau is not corrected.
(4) Case 4: the altitude at the constraint $C_n$ is strictly lower than the upper limit of the constraint (possibly with a tolerance, for example 100 ft): This case arises when the target thrust was previously lowered to avoid level flight at the altitude constraint $C_n$. After integration, the altitude at the constraint is clearly lower (necessarily an AT or BELOW or WINDOW constraint). In this case, even if the target thrust allows the various constraints to be met, it is under-valued and of no interest. Therefore, the target thrust is increased in order to obtain a higher climb rate. The target thrust must be comprised between the previous target thrust and the upper limit of the previous range. The method then passes to integration step 1.4.

In all the previous cases, the new target thrust will possibly be obtained via various methods (dichotomy in the possible range, brute force, estimation, etc.).

In other cases, the method passes to step 1.1 of FIG. 2, with $C_n$ taken as the new point of initialization of the integration (Pinit=Cn), without additional correction.

Step 1.4: Computation of Integration Between PS and $C_n$

This step consists in performing an integration with the fitted parameters defined in the previous step. This computation is carried out between the save point (PS) of the method and the next initially problematic constraint ($C_n$).

If none of the correction scenarios mentioned in the previous step exist (there are three scenarios regarding speed correction and four scenarios regarding thrust correction), the method then passes to step 1.1, with $C_n$ taken as the new point of initialization of the integration (Pinit=Cn). The previous integration continues, from $C_n$, based on a nominal strategy, i.e. with parameters such as conventionally used in the prior art.

In other cases, the method returns to the previous step, step 1.3.

Several variant embodiments are described below.

First Variant

A first variant consists in changing the parameters to be adjusted in step 1.2 of FIG. 2 while still employing an integration in "energy sharing" mode (sharing between potential energy and kinetic energy) with:

i. target speed the speed optimized from a performance point of view, limited by the various speed constraints, with an upper (AT OR BELOW or AT or WINDOW) limit, ii. engine thrust the nominal climb thrust (by default maximum climb thrust), iii. in contrast, the parameter consisting of the excess-energy-sharing ratio is fitted as well as possible.

In this case, the following steps (A), (B), (C) must be replaced as described below.

(A) Choice of Parameters to be Adjusted (Step 1.2):

The parameter consisting of the excess-energy-sharing ratio is fitted as well as possible between the save point and the problematic constraint ($C_n$) (n being incremented in each iteration of this step) in the following two scenarios:

(1) The altitude constraint $C_n$, with a lower (AT OR ABOVE or AT or WINDOW) limit, is missed, (2) A plateau exists at the altitude of an altitude constraint with an upper (AT OR ABOVE or AT or WINDOW) limit (not due to two altitude constraints of the same value).

The save point PS is also updated and positioned at $C_{n-1}$ when $C_{n-1}$ and $C_n$ were initially problematic for different reasons. For example, if $C_{n-1}$ was missed, then the save point PS is positioned at $C_{n-1}$ only if a plateau exists at $C_n$ (and vice versa), otherwise PS remains unchanged.

Figure 5:
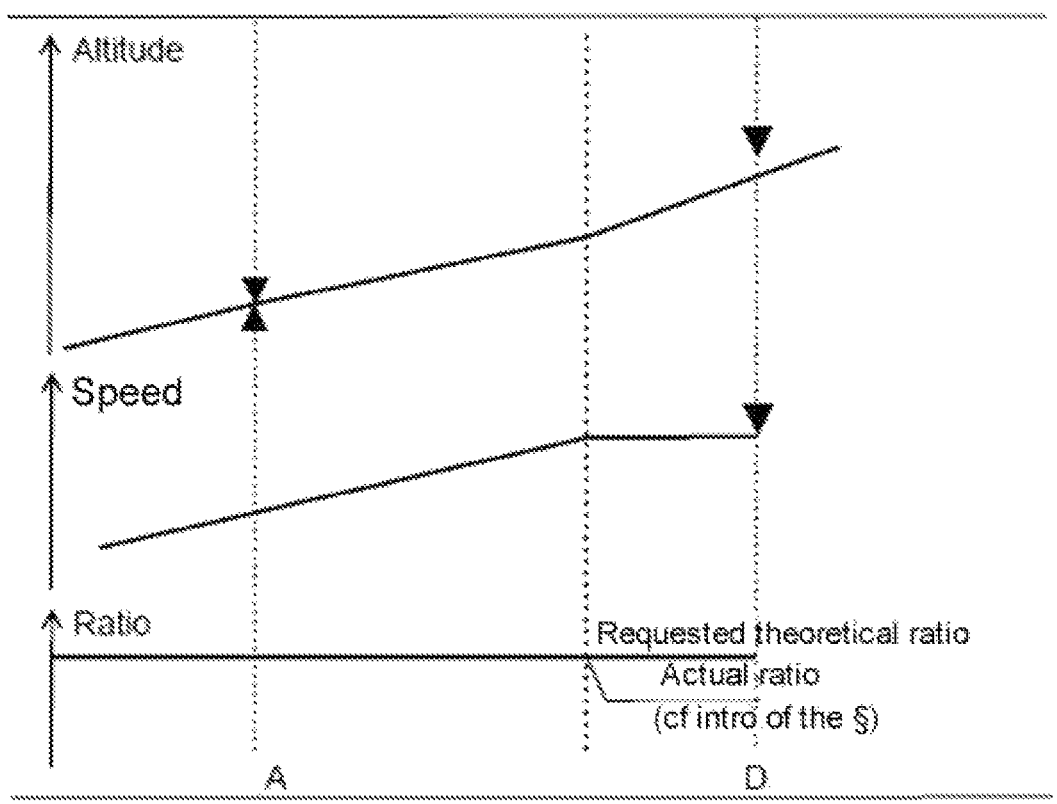
FIG. 5 illustrates the management of excess energy available.

(B) Computation of the Parameter to be Adjusted (Step 1.3):

To clarify the following, an excess-energy-sharing ratio in a range from 0 to 100 will be considered. A value of 0 indicates that all the excess energy is used to increase potential energy, and a value of 100 indicates that all the excess energy is used to increase kinetic energy. The value 0 will be replaced by a slightly higher value Ratio_min if level flight cannot be used to meet a speed constraint. This ratio is only meaningful and impactful when none of the altitude and speed target values are reached, because, once one of the targets has been reached, all the available excess energy will naturally be employed to reach the last target, whatever the value of this ratio. This situation is illustrated in FIG. 5.

When the aircraft spends little time at constant speed in the integrated portion, the above feature makes modification of the ratio an even more effective way of solving the initial underlying problem of gradient. The most unfavorable case is integration over a constant-speed portion, since modification of the ratio will have no impact on gradient. Therefore, the target speed is highly important to the impact of the change in ratio on gradient.

Figure 6:
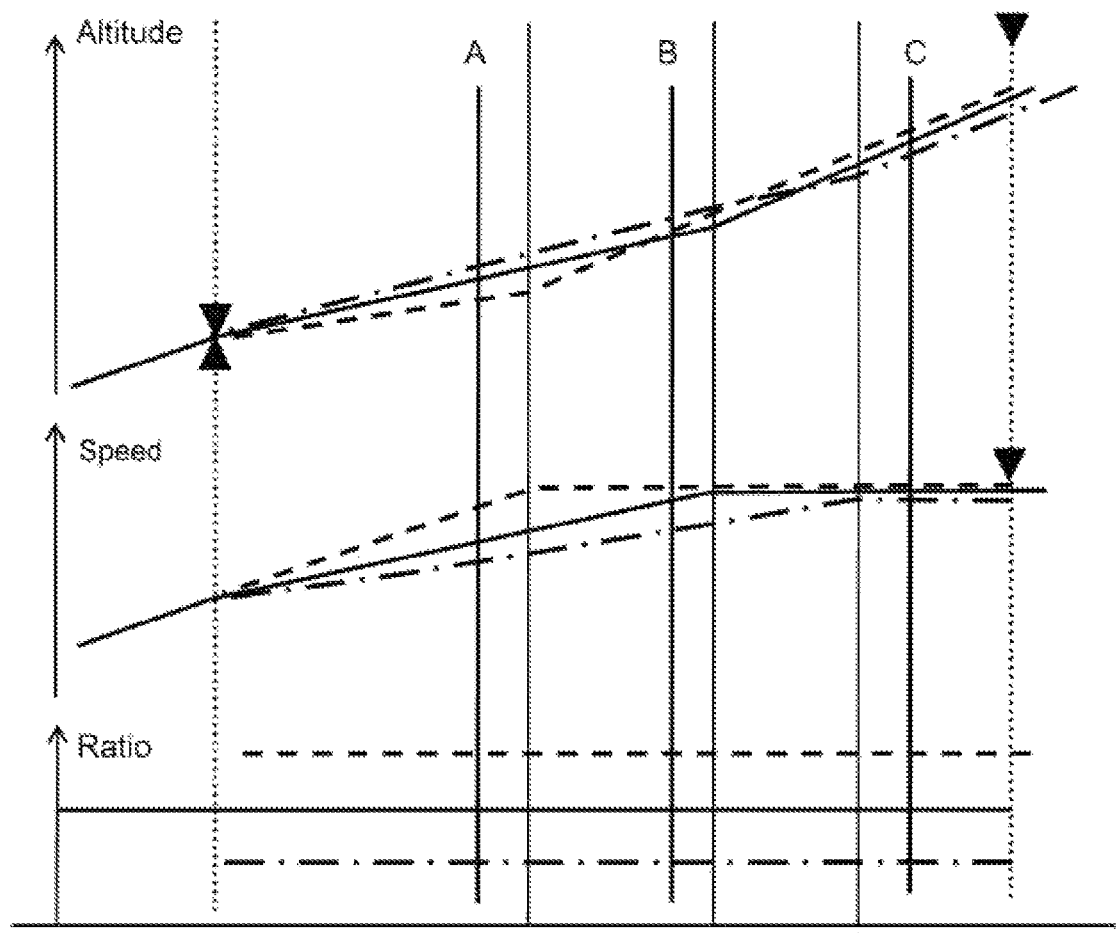
FIG. 6 illustrates the lack of an immediate relationship between the "direction" of the modification of the ratio and the impact on the average gradient during integration.

In addition, apart from the case where no time is spent at constant speed, contrary to method 1 (with thrust or speed correction), there is no immediate relationship between the "direction" of the modification of the ratio and the impact on the average gradient during integration. The case of FIG. 6 provides an illustration of this. From A (no constant speed over the integration), the lower the ratio, the steeper the gradient; however, from B and C, this is no longer the case.

The term ratio designates the theoretical ratio. Five scenarios are to be considered (in this order of priority) and the new ratio will possibly be obtained via various methods (brute force, estimator, etc.):

(1) Case 1: an altitude constraint is missed (possibly with a tolerance, for example 100 ft): in this case, the ratio is modified in order to obtain a higher average climb rate. The goal is to meet the constraint as well as possible.

(2) Case 2: A speed constraint is missed (possibly with a tolerance, e.g. 5 kts). In this case, the ratio is increased in order to obtain a higher acceleration rate.

(3) Case 3: in step 1.2, the constraint Cn was employed because it was missed and the altitude at $C_n$ is now strictly higher than the lower limit of the constraint (possibly with a tolerance, for example 100 ft): This case arises when the target ratio was previously modified to meet the altitude constraint. After integration, the altitude at the constraint is clearly higher (necessarily an AT or ABOVE or WINDOW constraint). In this case, even if the target ratio allows the various constraints to be met, it is over-corrected and of no interest. Therefore, the target ratio is again modified in order to obtain a lower climb rate. The goal is to meet the constraint as well as possible.

(4) Case 4: in step 1.2, the constraint $C_n$ was employed because it induced level flight (plateau) and the altitude at the constraint Cn is strictly lower than the upper limit of the constraint (possibly with a tolerance, for example 100 ft): This case arises when the target ratio was previously modified to avoid level flight (plateau) at the altitude constraint $C_n$. After integration, the altitude at the constraint is clearly lower (necessarily an AT or BELOW or WINDOW constraint). In this case, even if the target ratio allows the various constraints to be met, it is over-corrected and of no interest. Therefore, the target ratio is again modified in order to obtain a higher climb rate. The goal is to meet the constraint as well as possible.

(5) Case 5: a plateau exists (not due to two altitude constraints of the same value) (possibly with a tolerance, for example 1 NM). In this case, the ratio is modified in order to obtain a lower average climb rate. The goal is to meet the constraint as well as possible.

In all the above cases, if the ratio-modifying algorithm has "exhausted" all the possible cases (e.g. in case of brute force, all values in the range have been tested), the retained ratio will have to meet the following conditions, in order of priority:

No altitude constraint is missed between PS and Cn (possibly with a tolerance, e.g. 100 ft) (or errors if any minimized);

No speed constraint is missed between PS and Cn (possibly with a tolerance, e.g. 5 kts) (or errors if any minimized);

No altitude plateau exists between PS and Cn (or if there are any plateaus, their size is minimized);

The altitude at the constraint $C_n$ is strictly equal to the upper (lower, respectively) limit of the constraint if, in step 1.2, $C_n$ was not employed because it was missed (it induced level flight, respectively) (or errors if any minimized).

(C) Computation of Integration Between PS and $C_n$ (Step 1.4):

This step consists in performing an integration with the fitted parameters defined in the previous step. This computation is carried out between the save point (PS) of the method and the next initially problematic constraint ($C_n$).

If none of the correction scenarios mentioned in step 1.3 exist or if ratio correction is no longer possible, the method then passes to step 1.1, with Cn taken as the new point of initialization of the integration (Pinit=Cn). The previous integration (step 1.1) continues, from $C_n$, based on a nominal strategy, i.e. with parameters such as conventionally used in the prior art.

In other cases, the method goes back to step 1.3.

Second Variant

Figure 7:
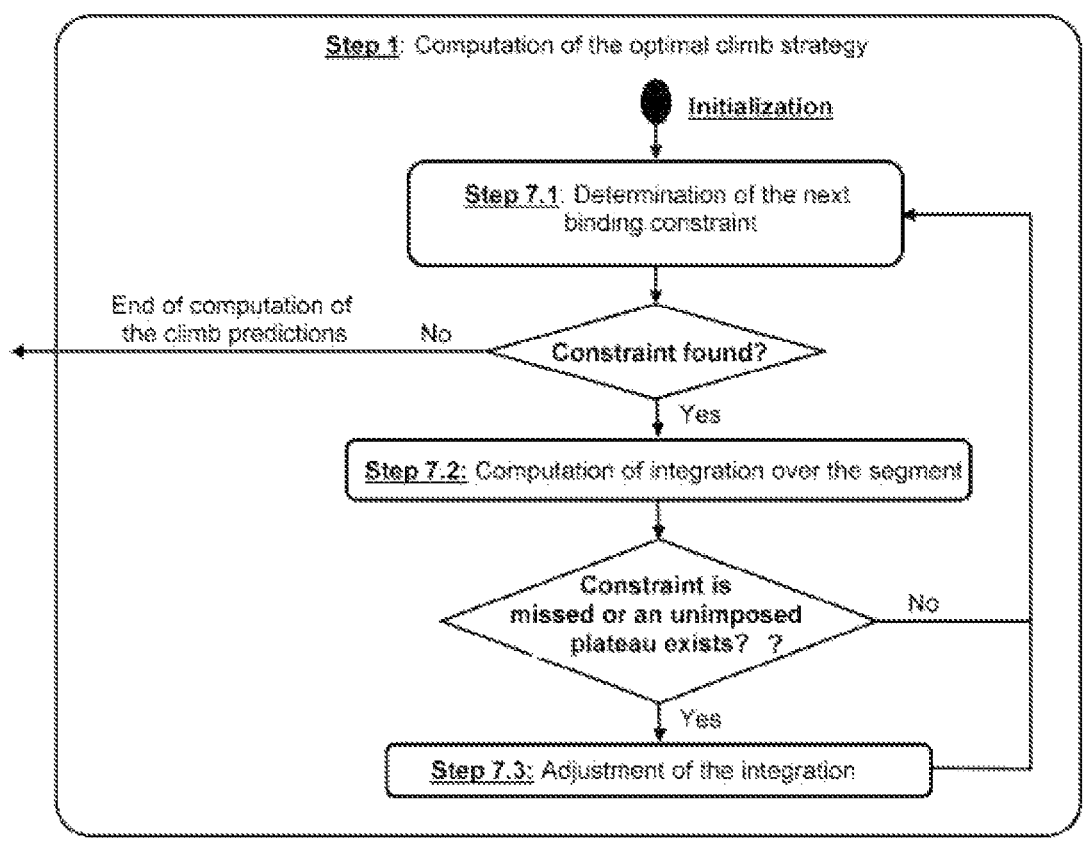
FIG. 7 shows a flowchart that illustrates one variant of the step of computing the optimal climb strategy of FIG. 1.

A second variant consists in changing the parameters to be adjusted using another mode of integration in which a gradient rather than energy sharing is imposed. In this case, the flowchart of step 110 (step 1 of FIG. 1) is modified as illustrated in FIG. 7:

step 1.1 becomes step 7.1: Computation of the binding constraint.

The first step of the method consists in finding the next binding altitude constraint on the basis of an algorithm which aims to minimize the number of gradient breaks in the computation of the profile.

The search is carried out from the integration point at which the method was initialized, and allows the next "AT" or "AT OR ABOVE" or "AT OR BELOW" or "WINDOW" constraint through which the profile will pass to be determined.

The first initialization point is positioned at the start of the computation of the climb-phase predictions, the climb being equivalent to achievement of the characteristic altitude referred to as "altitude acceleration" or of the aircraft if the latter is above this altitude.

From the initialization point of the method:

A geometric computation is performed until the next AT constraint if one exists, and:

If this computation allows all the intermediate constraints to be met, the next AT constraint is then the next binding constraint, and the method passes to the next step.

Otherwise, the computation is reinitialized at the point of initialization of the method, and targets the intermediate constraint that was missed (AT OR BELOW, AT OR ABOVE or WINDOW constraint). This step is repeated until the obtained geometric gradient allows all of the constraints to be met between the target and the point of initialization of the method. The target constraint is then the next binding constraint, and the method passes to the next step.

Otherwise, an integration computation is performed from the point of initialization of the method to the cruising level, under conventional climb assumptions, i.e. in "energy sharing" mode (sharing between potential energy and kinetic energy), with the following parameters:

The target speed, which is the speed optimized from a performance point of view, limited by the various speed constraints, with an upper (AT OR BELOW or AT or WINDOW) limit, The nominal engine climb thrust (by default the maximum climb thrust).

The energy-sharing ratio, which is the default target ratio, given for example by a performance table.

If this set allows all the altitude constraints to be met without level flight, there are no longer any binding altitude constraints, and the method passes directly to step 120 of computing the lateral path.

Figure 8:
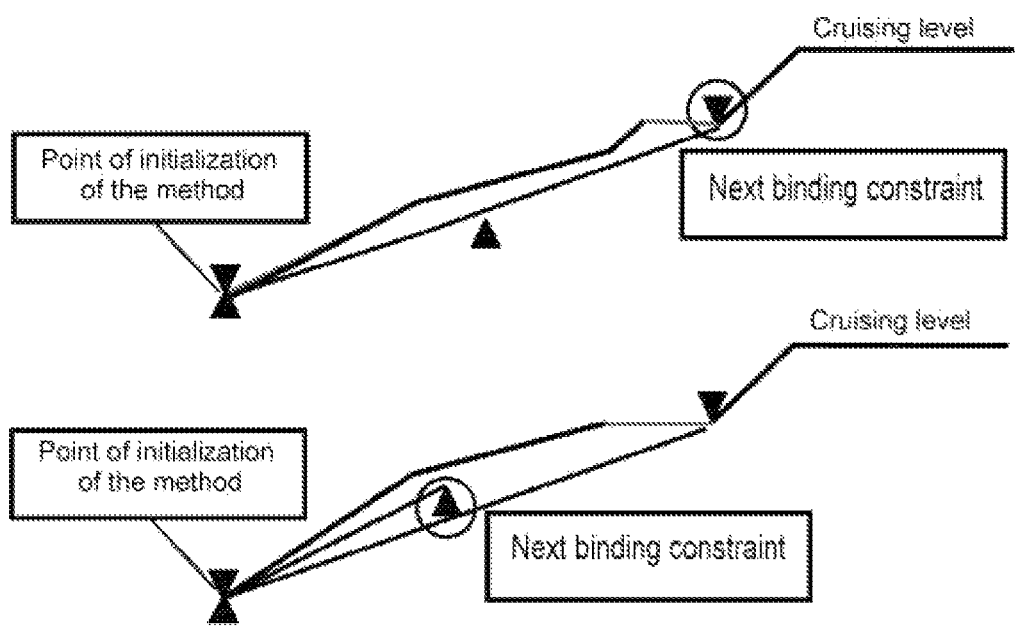
FIG. 8 illustrates one example of determining a binding altitude constraint.

Otherwise, the computation is reinitialized at the point of initialization of the method, and a geometric computation is carried out up to the next intermediate constraint that was missed or that has induced level flight (AT OR BELOW, AT OR ABOVE or WINDOW constraint). This step is repeated until the obtained geometric gradient allows all of the constraints to be met between the target and the point of initialization of the method. The target constraint is then the next binding constraint, and the method passes to the next step. This situation is illustrated in FIG. 8.

Step 1.2 Becomes Step 7.2: Computation of Integration Over the Segment

This step consists in performing a climb integration in "energy sharing" mode (sharing between potential energy and kinetic energy) with the following parameters:

The target speed, which is the speed optimized from a performance point of view, limited by the various speed constraints, with an upper (AT OR BELOW or AT or WINDOW) limit, The engine thrust, which is the nominal climb thrust (by default the maximum climb thrust), The energy-sharing ratio, which is the default target ratio, given for example by a performance table.

This computation is performed between the point of initialization of the method and the next binding constraint. Two scenarios are possible:

(1) No altitude constraint is missed and no altitude plateau exists (or it is due to two altitude constraints of the same value)—the method passes to step 7.1, in which the next binding constraint is taken as the new point of initialization of the method.

(2) The method returns to step 7.3 in other cases.

Step 1.3 Becomes Step 7.3: Adjustment of the Integration

The parameter to be adjusted is the integration mode. In this variant, the integration will be performed along a given geometric gradient with a target speed parameter, the target speed being the speed optimized from a performance point of view, limited by the various speed constraints, with an upper ("AT OR BELOW" or "AT" or "WINDOW") limit.

In this integration mode, the engine climb thrust is the result of the computation thus performed for a given speed profile and a given gradient.

The target gradient will be retained consistently with the two following scenarios:
(1) Case 1: the binding altitude constraint is missed (possibly with a tolerance, for example 100 ft): in this case, the target gradient is directly that connecting the point of initialization of the method to the lower limit of the next binding constraint (of "AT" or "AT or ABOVE" or "WINDOW" type). This gradient must nevertheless be limited to a maximum gradient called gradient max (for example the gradient allowing speed to be maintained at the start of integration with a maximum engine climb thrust (to avoid deceleration during the climb phase) or the gradient allowing the speed Vmin (previously defined in this document) to be maintained).
(2) Case 2: A plateau exists at the altitude of the binding constraint (not due to two altitude constraints of the same value) (possibly with a tolerance, for example 1 NM): In this case, the target gradient is directly that connecting the point of initialization of the method to the upper limit of the next binding constraint (of "AT" or "AT or BELOW" or "WINDOW" type).

Lastly, a climb integration is computed in gradient-following mode between the initialization point and the binding constraint with the following parameters:
  The target speed, which is the speed optimized from a performance point of view, limited by the various speed constraints, with an upper ("AT OR BELOW" or "AT" or "WINDOW") limit,
  The target gradient, which is the one previously computed.

Next, the method passes to step 7.1, in which the next binding constraint is taken as the new point of initialization of the method (since, by construction, there are no constraints and no plateaus/level flight between the initialization point and the binding constraint).

Third Variant

There is a third variant that is very similar to the second variant. It differs only in that the parameters to be adjusted are changed, in step 7.3, using a mode of integration in which a vertical climb speed (so-called "V/S") rather than a gradient is imposed.

Step 7.3 described in the second variant is replaced by the step described below:

Step 7.3—Third Variation: Adjustment of the Integration

The parameter to be adjusted is the integration mode. In this variant, the integration will be performed at an imposed vertical climb speed (so-called "V/S") with a target speed parameter, the target speed being the speed optimized from a performance point of view, limited by the various speed constraints, with an upper ("AT OR BELOW" or "AT" or "WINDOW") limit.

In this integration mode, the engine climb thrust is the result of the computation thus performed for a given speed profile and a given V/S.

The target V/S will be retained consistently with the following two scenarios (to be considered in this order of priority):
(1) Case 1: the binding altitude constraint is missed (possibly with a tolerance, for example 100 ft): in this case, the target V/S is increased in order to obtain a better climb rate. The target V/S must be comprised between a minimum vertical speed called VS_min (300 ft/min for example so that a controller having asked an airplane to climb actually sees it climbing) and the maximum vertical speed called VS_max (computed depending on the capacities of the airplane, with for example the speed at the start of integration and a maximum engine climb thrust) on the first correction for this constraint (or otherwise between the previous target V/S and the upper limit of the previous range).

In the case where the previous target V/S was already the upper limit of the range, the method passes directly to step 7.1, in which the next binding constraint is taken as the new point of initialization of the method, but otherwise the method continues in this step.
(2) Case 2: a plateau exists at the altitude of the binding constraint (not due to two altitude constraints of the same value) (possibly with a tolerance, for example 1 NM): In this case, the target V/S is decreased in order to obtain a lower climb rate. The target V/S must be comprised between VS_min and VS_max on the first correction for this constraint (or otherwise between the lower limit of the previous range and the previous target V/S).

In the case where the previous target V/S was already the lower limit of the range, the method passes directly to step 7.1, in which the next binding constraint is taken as the new point of initialization of the method, but otherwise the method continues in this step.

In all the previous cases, the new V/S will possibly be obtained via various methods (dichotomy in the possible range, brute force, etc.).

Lastly, a climb integration is computed in V/S-following mode between the initialization point and the binding constraint with the following parameters: The target speed, which is the speed optimized from a performance point of view, limited by the various speed constraints, with an upper (AT OR BELOW or AT or WINDOW) limit, The target V/S, which is the one previously computed.

Two scenarios are possible:
(1) No altitude constraint and no altitude plateau exists (or it is due to two altitude constraints of the same value)—the method passes to step 7.1, in which the next binding constraint is taken as the new point of initialization of the method.
(2) The method loops back to the start of the current step.

Figure 9:
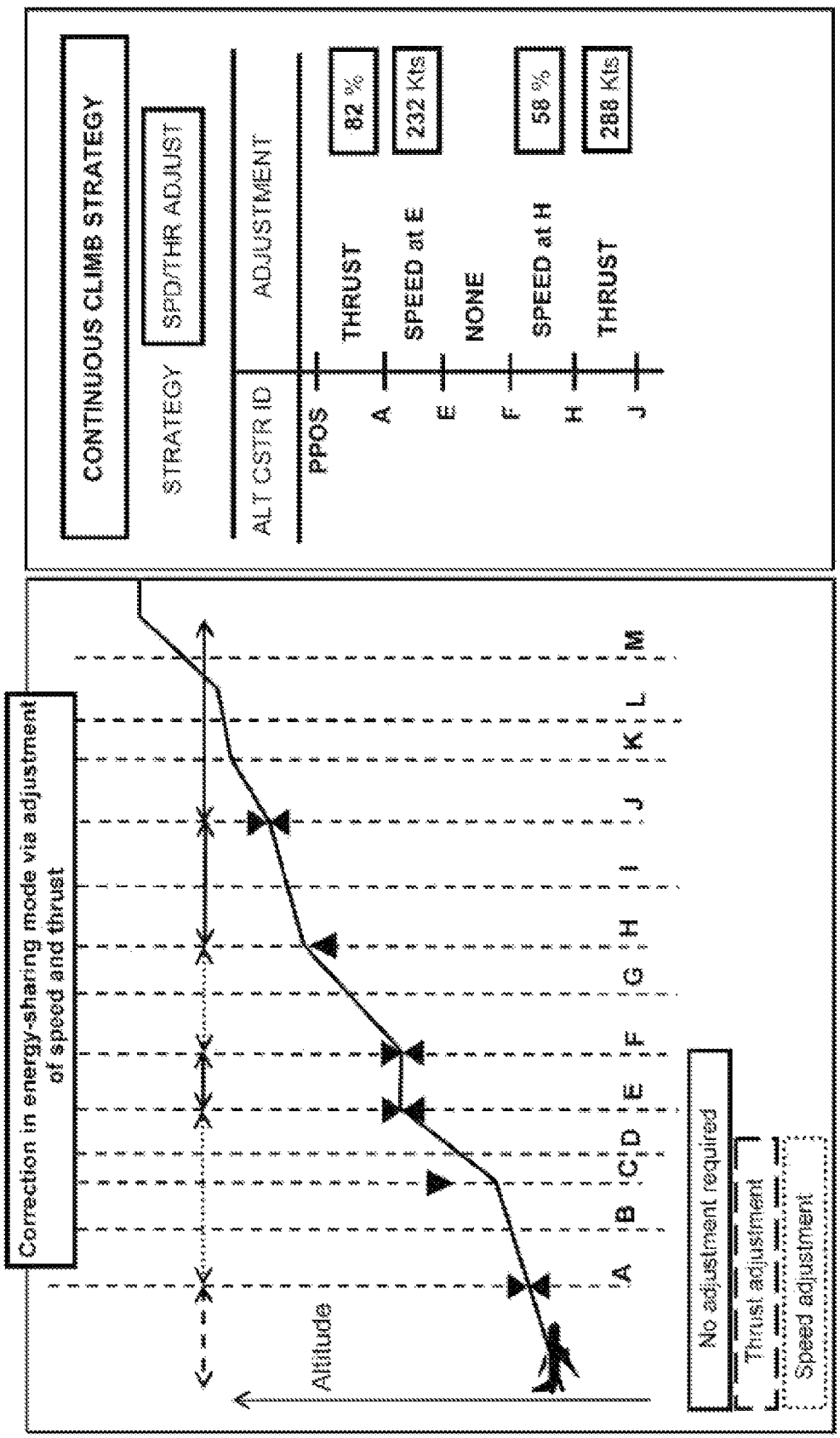
FIG. 9 illustrates one example of display according to one embodiment of the invention.

FIG. 9 illustrates one example of display according to one embodiment of the invention.

A dedicated page of the system may, for example, summarize the assumptions between each binding constraint, and allow the crew to override or ignore the datum computed by the system. In addition, this interface could allow the crew to select, from the various variants, the desired correction strategy. (SPEED/THRUST—ENERGY-SHARING RATIO—VERTICAL SPEED or FLIGHT-PATH ANGLE)

If a target speed is used at a given point, it could be displayed conventionally as an "AT OR BELOW" speed constraint positioned in the field provided for this purpose on the page describing the flight plan. A particular symbology would allow the pilot to distinguish it from procedural constraints, and to indicate whether it is a "pseudo-constraint" set by the system.

The target value (such as speed/thrust) could also be displayed to the crew for information purposes only, allowing the pilot to understand the assumptions made by the system and/or to allow this new setting to be followed manually. If it is modified due to an adjustment of the system, it could be displayed in a particular way (symbol or coloring) in the fields provided for this purpose.

The present invention may be implemented using hardware and/or software elements. It may be available in the form of a computer program product on a computer-readable medium. The medium may be electronic, magnetic, optical or electromagnetic.

According to the embodiments of the invention, the location in which the computations are performed may be varied: at the present time, both local (on-board) and remotely accessed (cloud) resources may be mobilized. It is also legitimate to think that very significant computing means may—or will eventually be able—to be located on-board (server rack, PC, tablets, smartphones, VR headsets, etc.).

In terms of hardware, the embodiments of the invention may be carried out by computer. The computer may be a rack or a tablet or an EFB or a software package integrated into the FMS, etc. The architecture may be distributed, and for example of the "cloud computing" type. Peer-to-peer servers, completely or partially distributed (existence of centers) may interact. There may be one or more privileged nodes, when it comes to private cloud or private blockchain. The access may be multiplatform (e.g. from EFB, WebApp, ground access, etc.). One or more EFBs may interact with one or more FMSs to manage computations.

The invention claimed is:

1. A method for optimizing the climb phase of an aircraft or a drone, the method being computer-implemented in an on-board or ground-based flight management system, avionics navigation system, or non-avionics navigation system, and the method comprising the steps of:
    determining an optimal continuous climb strategy for the climb phase, the optimal continuous climb strategy being determined depending on flight-profile parameters, said flight-profile parameters comprising altitude and/or speed constraints, and/or settings in respect of speed and/or thrust and/or level-flight avoidance and/or gradient-variation minimization, and allowing vertical climb predictions for the climb phase to be computed;
    determining a lateral path, depending on lateral-path parameters comprising settings in respect of turn radius as a function of roll-angle settings, and depending on the vertical predictions for the climb phase computed for the flight-profile parameters; and
    iterating the two previous steps on each constrained climb segment of the aircraft or drone climb path, a constrained climb segment being a segment of the climb path containing a binding constraint; then iterating the two previous steps over the entire climb path, while fitting in each iteration said flight-profile parameters and said lateral-path parameters, until all the binding constraints have been met one by one according to a predefined strategy,
    wherein the iterating step consists of an incremental method for solving a binding constraint (Cn) for a constrained segment from a save point issued from the previous constrained segment (Cn−1), which save point is re-estimated in order to solve the binding constraint (Cn), the segment-by-segment fit leading to reconsideration of the i previous segments impacted by the solution of constraint n, the setting parameters selected being applicable to all of the constrained climb segments between Cn−i and Cn.

2. The method as claimed in claim 1, wherein the iterating step is carried out using an iterative method for fitting parameters, chosen from:
    a dichotomous fitting method;
    a brute-force fitting method;
    a so-called secant fitting method;
    an estimator-based fitting method;
    the choice of the method possibly being dictated by a criterion of better performance in respect of response time.

3. The method as claimed in claim 1, wherein the predefined strategy is adjustable by a user and comprises one or more parameters selected from:
    a setting in respect of the energy-sharing ratio between potential energy and kinetic energy;
    a setting in respect of the climb gradient;
    a setting in respect of the vertical climb rate;
    a setting in respect of the longitudinal speed during the climb;
    a setting in respect of the climb thrust; and/or
    a setting in respect of the roll angle.

4. The method as claimed in claim 1, wherein one or more target settings are converted into pseudo-constraints taken into account in the computation of the vertical predictions.

5. The method as claimed in claim 1, wherein one or more intermediate computation results, pieces of information relating to the root causes and/or the computation context of the steps of the method are displayed on a human-machine interface offering options in respect of modifications by a user.

6. The method as claimed in claim 1, further comprising a step of applying the optimal continuous climb strategy, by transmitting all or some of the computed information with a view to it being actually exploited by avionic systems in order to apply the obtained optimal climb strategy.

7. A system comprising one or more flight management system (FMS) computers, or on-board tablet-based or ground-based non-avionics navigation computers, for implementing the steps of:
    determining an optimal continuous climb strategy for the climb phase, the optimal continuous climb strategy being determined depending on flight-profile parameters, said flight-profile parameters comprising altitude and/or speed constraints, and/or settings in respect of speed and/or thrust and/or level-flight avoidance and/or gradient-variation minimization, and allowing vertical climb predictions for the climb phase to be computed;
    determining a lateral path, depending on lateral-path parameters comprising settings in respect of turn radius as a function of roll-angle settings, and depending on the vertical predictions for the climb phase computed for the flight-profile parameters; and
    iterating the two previous stepson each constrained climb segment of the aircraft or drone climb path, a constrained climb segment being a segment of the climb path containing a binding constraint; then iterating the two previous steps over the entire climb path, while fitting in each iteration said flight-profile parameters and said lateral-path parameters, until all the binding constraints have been met one by one according to a predefined strategy,
    wherein the iterating step consists of an incremental method for solving a binding constraint (Cn) for a constrained segment from a save point issued from the previous constrained segment (Cn−1), which save point is re-estimated in order to solve the binding constraint (Cn), the segment-by-segment fit leading to reconsideration of the i previous segments impacted by the solution of constraint n, the setting parameters selected being applicable to all of the constrained climb segments between (Cn−i) and (Cn).

8. A non-transitory computer readable medium comprising code instructions that allow a process comprising the steps of:

determining an optimal continuous climb strategy for the climb phase, the optimal continuous climb strategy being determined depending on flight-profile parameters, said flight-profile parameters comprising altitude and/or speed constraints, and/or settings in respect of speed and/or thrust and/or level-flight avoidance and/or gradient-variation minimization, and allowing vertical climb predictions for the climb phase to be computed;

determining a lateral path, depending on lateral-path parameters comprising settings in respect of turn radius as a function of roll-angle settings, and depending on the vertical predictions for the climb phase computed for the flight-profile parameters; and iterating the two previous stepson each constrained climb segment of the aircraft or drone climb path, a constrained climb segment being a segment of the climb path containing a binding constraint; then iterating the two previous steps over the entire climb path, while fitting in each iteration said flight-profile parameters and said lateral-path parameters, until all the binding constraints have been met one by one according to a predefined strategy;

the process to be performed, when said program is executed on a computer, wherein the iterating step consists of an incremental method for solving a binding constraint (Cn) for a constrained segment from a save point issued from the previous constrained segment (Cn−1), which save point is re-estimated in order to solve the binding constraint (Cn), the segment-by-segment fit leading to reconsideration of the i previous segments impacted by the solution of constraint n, the setting parameters selected being applicable to all of the constrained climb segments between (Cn−i) and (Cn).

* * * * *